Nov. 7, 1961     B. S. NAVEN ET AL     3,007,440
APPARATUS FOR APPLYING SOLDER TO THE
ENDS OF FOIL CAPACITORS
Filed July 21, 1958
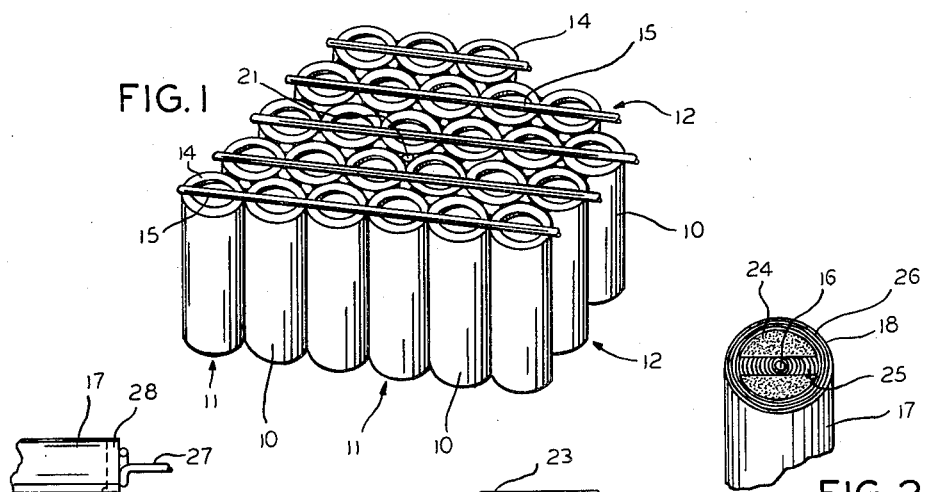
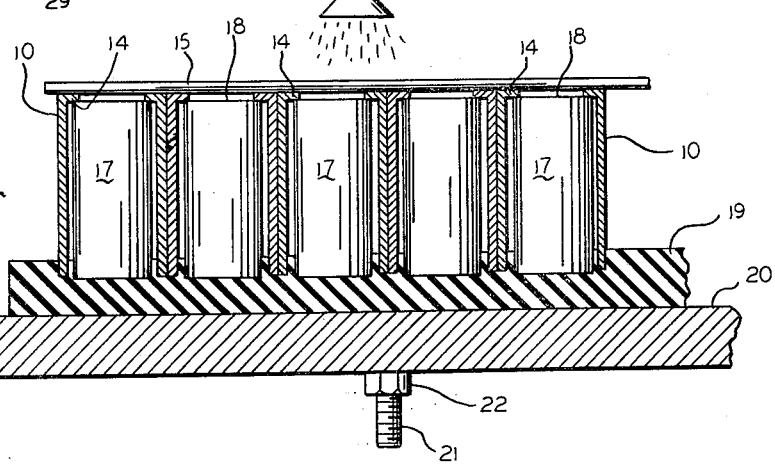
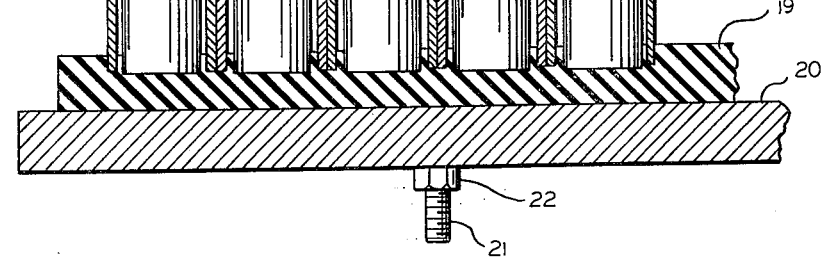
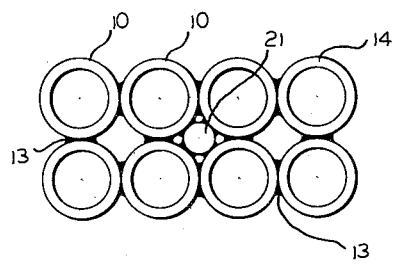
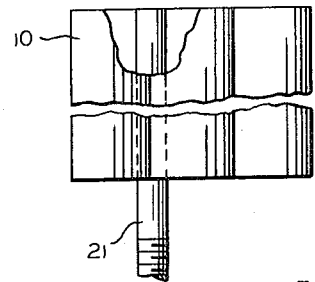
INVENTORS
BENJAMIN S. NAVEN
RAYMOND J. SIMPSON
BY
JOHN W. GRAHAM
ATTORNEY

United States Patent Office 3,007,440
Patented Nov. 7, 1961

3,007,440
APPARATUS FOR APPLYING SOLDER TO THE ENDS OF FOIL CAPACITORS
Benjamin S. Naven and Raymond J. Simpson, Chicago, Ill., assignors, by direct and mesne assignments, to Dearborn Electronic Laboratories of Delaware, Inc., Orlando, Fla., a corporation of Delaware
Filed July 21, 1958, Ser. No. 749,964
4 Claims. (Cl. 118—503)

This invention relates to the fabrication of capacitors, and more particularly to a capacitor product and a method and structure for preparing the same for the securance of lead wires thereto.

Tubular capacitors (e.g., metallized film or paper) comprise alternate laminations of electrodes and dielectric strips wound on a mandrel into a generally tubular configuration. The electrodes are separated from each other by the dielectric laminations, and are offset transversely so that the outer edge of the respective electrodes are exposed at the opposite ends of the tubular capacitor. The reason that the ends are exposed is to permit the connection of lead wires thereto, and conventionally this is accomplished by first spraying or otherwise coating the edges with tin or other conductive material to which the lead wires may then be bonded.

However, the procedure now employed in coating the electrode edges is to first wrap each capacitor in a protective casing that may be paper or other inexpensive material. The capacitors so wrapped are arranged in parallel juxtaposition, and the entire grouping thereof is tied together by a cord or similar means. Thereafter, the ends of the capacitors are sprayed with tin to provide a coating thereover, and after the ends are coated lead wires are soldered thereto. Either before or after the lead wires are secured to the electrodes, the protective casing must be removed from the capacitors. It will be apparent that these are time-consuming and therefore expensive operations, but more importantly, a relatively high percentage of defective capacitors results from this procedure.

There are several reasons for this, one of which is that the capacitors have a small opening extending centrally therethrough which is formed by the mandrel on which the electrode and dielectric strips are wound. This central core or opening is often at least partially filled with tin deposits, and may thereby short the electrodes. Secondly, the sprayed tin often runs down between the laminations, especially at the looser outer turns thereof; and since the electrodes are separated from each other by only a very short distance (for example, from 1/32 to 1/64 of an inch), again the electrodes may be shorted. Additionally, capacitors of this type are frequently self-healing, whereupon the electrode in the area of a dielectric puncture is vaporized. Such vaporization charges the surrounding air within the capacitor with conducting particles, and if such air cannot escape the capacitor does not heal itself, but instead continues to short out until the air can escape or until some other component in the electric circuit breaks down. It will be apparent that if the ends of the capacitor are ensheathed in a tin coating, the avenues of escape for the charged air are substantially minimized if not completely eliminated.

In view of these considerations, an object of the present invention is to provide a method and apparatus for fabricating wound tubular capacitors, wherein the quality of the capacitor product is improved, and in which the cost of such fabrication is reduced by handling the same on a high production basis. Another object of the invention is that of providing a wound tubular capacitor having lead wires soldered to the tin-coated ends of the capacitor, but in which an untinned area extends across such ends and around the circumferential edge thereof to permit the escape of air from between the capacitor laminations.

Still another object is in the provision of capacitor product of the character described, in which the arbor hole and outer turns of the wound laminations are devoid of tin, whereby the reliability of the product is increased and the rejects resulting from electrode shorting are substantially reduced. A further object is to provide a masking assembly adapted to handle a relatively large number of capacitors simultaneously, and which is effective to locate the tin coating on the ends of the capacitors in certain predetermined areas thereon whereby the quality and reliability of the capacitor product is improved while still permitting electrically and mechanically adequate solder connection of the lead wires thereto. Additional objects and advantages of the invention will become apparent as the specification develops.

An embodiment of the invention is illustrated in the accompanying drawing, in which:

FIGURE 1 is a perspective view of a portion of the masking apparatus; FIGURE 2 is an enlarged, broken perspective view of an end portion of a capacitor in condition for having a lead wire secured thereto; FIGURE 3 is an enlarged, broken side view in elevation of a capacitor with the lead wire secured thereto; FIGURE 4 is an enlarged, broken vertical sectional view taken through the masking apparatus; FIGURE 5 is a top plan view of a portion of the apparatus; and FIGURE 6 is a further enlarged, side view in elevation of a portion of the apparatus.

The masking apparatus comprises a plurality of individual mask units or containers 10 which are hollow and oriented in longitudinal rows 11 and transversely extending rows 12. In FIGURE 1, six longitudinally extending rows and five transversely extending rows are illustrated, and these rows comprise 26 individual containers 10. The containers 10 are secured to each other (as shown in FIGURE 5) by solder joints 13 or other suitable means. Preferably, the containers 10 are formed of a material or are coated with such material, chromium for example, that prevents the adherence of solder thereto. The containers 10 are equipped at the upper ends thereof with an inwardly turned lip 14, and are open at the bottom end thereof as is shown most clearly in FIGURE 4. The lip or flange 14 is relatively narrow, and in one specific construction has a width of approximately 1/16 of an inch. The lip is also a relatively thin element, and preferably has a thickness that does not exceed 0.015 inch. If it is formed integrally with the side walls of the tubular containers as shown in FIGURE 4, it will be apparent that the container throughout may have the same wall thickness.

Extending across the tops of the containers 10 are a plurality of masking straps 15. Individual strap units could be used for each of the containers 10, but conveniently elongated masking straps are employed as shown in FIGURES 1 and 4, and these may extend along the longitudinal rows 11 or along the transverse rows 12 as shown. The straps 15 are centrally disposed with respect to the masking containers 10, and are soldered or otherwise rigidly secured thereto. Preferably, the straps 15 are formed of or are plated with chromium so as to prevent the adherence of solder spatter thereto, and they will be relatively thin units and preferably have a thickness that does not exceed 0.005 inch. The width of the straps is such that they completely cover the passage or arbor hole 16 in a tubular capacitor 17. The reason that the lips 14 and masking straps 15 are relatively thin elements is to bring the masking straps into close adjacency with the ends 18 of the capacitors 17, as shown in FIGURE 4; and it will be apparent that if desired, the straps 15 could be deformed so as to seat within the annular spaces defined by the lips 14, but it has been found that such refinement is not essential.

The entire container composition is adapted to seat upon a compressible resilient pad 19 such as rubber, that extends along and may be adhesively secured to a rigid backing or base plate 20. The container unit is clamped to the pad and base plate by means of one or more threaded studs 21 that extend downwardly through the pad 19 and plate 20 for receipt of a nut 22. The studs 21 extend into the spaces defined between adjacent containers 10 as shown in FIGURES 5 and 6, and are soldered or otherwise secured thereto. Therefore, when the nuts 22 are tightened upon the studs 21, the containers 10 are drawn downwardly against the upper surface of the resilient pad 19 to compress the same, as shown in FIGURE 4.

The containers 10 are dimensioned cylindrically so as to receive a variety of different sized capacitors 17 therein. The lip 14, if it has a width of approximately ⅟₁₆ of an inch, will also accommodate capacitors of various diameter, and will define a masking band about the outer edge portion thereof, as shown in FIGURE 4. The containers 10 are also slightly shorter than the capacitors 17 to be received therein (FIGURE 4), whereby the resilient pad 19 forces the end portions 18 of such capacitors into tight abutment with the annular lips 14.

In use of the device, capacitors 17 are placed within the respective masking containers 10, and the studs 21 are moved through the openings therefor in the pad 19 and base plate 20 so as to assemble the components of the apparatus as shown in FIGURE 4. The nuts 22 are then tightened upon the studs 21 to compress the pad 19 slightly, and thereby urge the individual capacitors 17 upwardly and into abutment with the respective annular lips 14. At the same time, the pad surrounds the lower end portions of the containers 10 so as to protect the interiors thereof and the capacitors therein from solder spatter. Thereafter, the assembled unit is disposed beneath a spray head 23 as shown in FIGURE 4, which discharges a solder spray downwardly and onto the ends 18 of the capacitors. Preferably, the spray head 23 is maintained substantially normal to the plane defined by the masking straps 15 so as to minimize the solder material that finds its way beneath the straps. It will be noted that while the word "solder" has been used to define the material discharged from the spray head 23, it is meant to include pure tin, tin compositions or any other material that may be suitable for use as a coating on the ends of the capacitors to prepare the same for the securance of lead wires thereto.

After such spraying operation, the nuts 22 are released to permit separation of the containers 10 from the pad 19 and base plate 20. The capacitors 17 are then removed from the containers and replaced in the containers in reverse position. The unit is then assembled and the spray operation repeated so as to deposit a coating on the other ends of the capacitors. After this has been done, the unit is again disassembled and the capacitors removed. Each end of the capacitors has a metallic coating 24 thereon, as shown in FIGURE 2. The coating comprises two substantially semi-circular portions separated by a strip 25 of generally rectangular configuration that has substantially no coating thereon. The uncoated or unsoldered strip 25 extends completely across the end 18 of each capacitor, and embodies the arbor hole 16 within the dimensional limits thereof. Similarly, the coated area 24 is surrounded by an annular band 26 along the outer circumferential surface of the capacitor. This band 26 also has substantially no solder deposition thereon.

Thereafter, the capacitors 17 have lead wires 27 secured to the coated ends thereof, as shown in FIGURE 3. Ordinarily, the lead wires 27 are twisted at an end thereof into a generally circular configuration as shown in FIGURE 3, and are soldered to the coating 24. The lead wires 27 are connected electrically by means of the coating 24 to the respective electrodes of the capacitors 17 because the coating is both mechanically and electrically connected to such electrodes. This is believed to be evident in FIGURE 3, which shows that the capacitor comprises two electrodes 28 and 29 which are offset from each other so that the electrode 28 extends outwardly beyond the electrode 29 at one end of the capacitor, and vice versa. It will be appreciated that the overlying areas of the electrodes are separated one from another by dielectric strips (not shown) which is conventional in capacitor construction.

The quality of the capacitor 17 and operating life thereof is improved because the uncoated areas 25 and 26 at the ends thereof permit the escape of air from the interior of the capacitor caused by the self-healing characteristics thereof, should shorts develop in the capacitor during its use. Further, the number of rejects or defective capacitors is minimized because the masking straps 15 prevent solder or spray from entering the arbor hole 16; and also, the annular lips 14 prevent solder spray from running between the relatively loose outer laminations of the capacitor comprising juxtaposed layers of electrodes and dielectric sheets. At the same time, a relatively uniform coating 24 is deposited on the ends 18 of the capacitors so that the lead wires 27 may be readily secured thereto. Additionally, the masking apparatus and coating process materially decreases the cost of fabricating the capacitors because they eliminate the time-consuming hand operations heretofore essential, wherein the individual capacitors had to be protectively wrapped before the spraying operation to mask the same and prevent solder adherance to the cylindrical surface areas thereof.

The apparatus is readily cleaned, for solder spatter does not adhere to the chromium surfaces thereof and may be easily brushed off. Similarly, any spatter deposit along the upper surface of the pad 19 is readily removable therefrom. The procedure may be employed with substantially any wound capacitor comprising dielectric and electrode laminations, whether defined by metallized dielectrics (metallized Mylar, for example) or foil constructions such as aluminum foil electrodes separated by paper or plastic dielectrics.

While in the foregoing specification an embodiment of the invention has been described in considerable detail for purposes of making an adequate disclosure thereof, it will be apparent that those skilled in the art may make changes therein without departing from the spirit and principles of the invention.

We claim:

1. In an apparatus for applying solder to the ends of foil capacitors wound upon a mandrel, the combination comprising a plurality of tubular containers dimensioned to receive a plurality of wound capacitors and arranged side by side with their ends alined in a common plane, means partially enclosing the alined ends of the tubular with their respective masking members, said masking members extending across the centers of the respective individual containers thereby to mask the hole left by the mandrel, and means for simultaneously urging the capacitors inwardly into said containers and into engagement with their respective masking members, said masing members being dimensioned to occupy only a minor fraction of the area of the container ends so that when solder is sprayed on capacitors assembled in said containers most of the area of the ends of the capacitors will have a layer of solder applied thereto for electrically and mechanically binding the convolutions of foil together while leaving the center portion of the capacitors, including the hole left by the mandrel, free of solder.

2. In an apparatus for applying solder to the ends of foil capacitors wound upon a mandrel, the combination comprising a plurality of tubular containers dimensioned to receive a plurality of wound capacitors and arranged side by side with their ends alined in a common plane, said containers each having a mask in the form of a diametrical strip extending across the center of the container thereby to mask the hole left by the mandrel, and means for simultaneously urging the capacitors inwardly into said containers and into engagement with said mask, so that when solder is sprayed onto said common plane the exposed ends of the capacitors will have a layer of solder applied thereto for electrically and mechanically binding the convolutions of foil together while leaving a central strip on each of the capacitors, including the hole left by the mandrel, free of solder.

3. In an apparatus for applying solder to the ends of foil capacitors wound upon a mandrel, the combination comprising a plurality of tubular containers dimensioned to receive a plurality of wound capacitors and arranged side by side with their ends in a common plane, each of said containers having an inwardly turned lip, means for simultaneously urging the capacitors inwardly into said containers and into contact with said lip, each container having a mask in the form of a diametrically extending strip arranged across the center of the container thereby to mask the hole left by the mandrel, said masking member occupying only a minor fraction of the area of the container ends so that when solder is sprayed onto the ends of the containers, most of the area of the ends of the capacitors will have an adherent layer of solder applied thereto for electrically and mechanically binding the convolutions of foil together while leaving a central strip on each of the capacitors, including the hole left by the mandrel, free of solder.

4. In an apparatus for applying solder to the ends of capacitors wound upon a mandrel, the combination comprising a plurality of tubular containers dimensioned to receive a plurality of wound capacitors and arranged side by side with their ends alined in a common plane and with at least a portion of the containers arranged in a straight row, a masking member in the form of a flat strip extending across the centers of the containers in the row thereby to mask the holes left by the mandrels, and means for simultaneously urging the capacitors inwardly into said containers and into engagement with said masking member so that when solder is sprayed thereon the ends of the capacitors will have a layer of solder applied to the exposed areas thereof for electrically and mechanically binding the convolutions of foil together while leaving the center portion of the capacitors including the hole left by the mandrel free of solder.

References Cited in the file of this patent

UNITED STATES PATENTS

| | | |
|---|---|---|
| 1,584,914 | Yaffee | May 18, 1926 |
| 1,835,004 | Bleecker | Dec. 3, 1931 |
| 2,462,899 | Riecker | Mar. 1, 1949 |
| 2,470,826 | McMahon | May 24, 1949 |
| 2,493,231 | Lange | Jan. 3, 1950 |
| 2,545,638 | Wheatley | Mar. 20, 1951 |
| 2,690,733 | Eger | Oct. 5, 1954 |
| 2,834,317 | Eger et al. | May 13, 1958 |
| 2,851,765 | Hanlet | Sept. 16, 1958 |
| 2,853,764 | De Michele | Sept. 30, 1958 |
| 2,895,854 | LeRocque | July 21, 1959 |